US012126089B2

(12) United States Patent
Sudo

(10) Patent No.: US 12,126,089 B2
(45) Date of Patent: Oct. 22, 2024

(54) ANTENNA DEVICE, ANTENNA MODULE, AND COMMUNICATION DEVICE

(71) Applicant: Murata Manufacturing Co., Ltd., Nagaokakyo (JP)

(72) Inventor: Kaoru Sudo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 311 days.

(21) Appl. No.: 17/679,098

(22) Filed: Feb. 24, 2022

(65) Prior Publication Data

US 2022/0181794 A1 Jun. 9, 2022

Related U.S. Application Data

(63) Continuation of application No. PCT/JP2020/025792, filed on Jul. 1, 2020.

(30) Foreign Application Priority Data

Aug. 28, 2019 (JP) ................................ 2019-155547

(51) Int. Cl.
*H01Q 9/04* (2006.01)
*H01Q 21/00* (2006.01)
*H01Q 21/24* (2006.01)
*H01Q 21/30* (2006.01)

(52) U.S. Cl.
CPC ........... *H01Q 21/30* (2013.01); *H01Q 9/0421* (2013.01); *H01Q 21/0025* (2013.01); *H01Q 21/24* (2013.01)

(58) Field of Classification Search
CPC .. H01Q 21/30; H01Q 9/0421; H01Q 21/0025; H01Q 21/24; H01Q 5/42; H01Q 21/08; H01Q 21/28
See application file for complete search history.

(56) References Cited

U.S. PATENT DOCUMENTS

2020/0358165 A1* 11/2020 Jeong .................... H04M 1/026
2020/0358203 A1* 11/2020 Park ....................... H01Q 9/045

FOREIGN PATENT DOCUMENTS

JP 63-131408 U 8/1988
JP 2-97104 A 4/1990
JP 4-122104 A 4/1992
JP 5-41211 U1 6/1993
JP 6-224628 A 8/1994

(Continued)

OTHER PUBLICATIONS

International Search Report and Written Opinion mailed on Sep. 24, 2020, received for PCT Application PCT/JP2020/025792, Filed on Jul. 1, 2020, 10 pages including English Translation.

*Primary Examiner* — David E Lotter
(74) *Attorney, Agent, or Firm* — XSENSUS LLP

(57) ABSTRACT

The antenna device includes multiple first radiation plates and multiple second radiation plates. Each of the first radiation plates has a first feed point and a first ground end portion, and radiates a first radio wave. Each of the second radiation plates has a second feed point and a second ground end portion, and radiates a radio wave of a frequency different from the frequency of the first, radio wave. When the antenna device is viewed in a direction orthogonal to the polarization direction of the first radio wave, the first radiation plate and the second radiation plate are disposed so as not to overlap.

13 Claims, 8 Drawing Sheets

(56) References Cited

FOREIGN PATENT DOCUMENTS

| | | | |
|---|---|---|---|
| JP | 2005-260917 | A | 9/2005 |
| JP | 2019-92130 | A | 6/2019 |
| WO | 2019/116970 | A1 | 6/2019 |

* cited by examiner

ANTENNA DEVICE, ANTENNA MODULE, AND COMMUNICATION DEVICE

CROSS-REFERENCE TO RELATED APPLICATIONS

The present application is a continuation application of International Patent Application No. PCT/JP2020/025792, filed Jul. 1, 2020, which claims priority to Japanese Patent Application No. 2019-155547, filed Aug. 23, 2019, the entire contents of each of which being incorporated herein by reference.

TECHNICAL FIELD

The present disclosure relates to a multiband antenna device, an antenna module, and a communication device.

BACKGROUND ART

It has been known a communication device including a one side short-circuited patch antenna (plate-shaped inverted-F antenna) with one end portion thereof grounded. In general, in a normal patch antenna having no grounded portion, preferable radiation characteristics are obtained by making the radiation plate length be approximately one half of the wavelength. Whereas in a one side short-circuited patch antenna, preferable radiation characteristics are obtained by making the radiation plate length be approximately one fourth of the radiation wavelength. Therefore, in a case of using a one side short-circuited patch antenna, it is possible to further reduce the antenna device in size as compared with a case of using a normal patch antenna.

A multiband communication device including the one side short-circuited patch antenna described above is disclosed in Japanese Unexamined Utility Model Registration Application Publication No. 63-131408 (Patent Document 1), for example. The communication device disclosed in this publication includes multiple first, one side short-circuited patch antennas each of which radiates a first radio wave, and multiple second one side short-circuited patch antennas each of which radiates a radio wave of a frequency different from the frequency of the first radio wave. The first one side short-circuited patch antenna and the second one side short-circuited patch antenna are alternately disposed in a row along a direction orthogonal to the polarization direction of the first radio wave.

CITATION LIST

Patent Document

Patent Document 1: Japanese Unexamined Utility Model Registration Application Publication No. 63-131408

SUMMARY

Technical Problem

In the communication device disclosed in Japanese Unexamined Utility Model Registration Application Publication No. 63-131408, a first, one side short-circuited patch antenna and a second one side short-circuited patch antenna are disposed in a row as described above. As a result, the distance between antennas adjacent to each other becomes too short, and there arises a possibility that radiation characteristics such as front gain or beam shape may deteriorate.

The present, disclosure has been made to solve the problem described above, and an object of the present disclosure is to make it unlikely that the radiation characteristics deteriorate in a multiband communication device including a one side short-circuited patch antenna.

Solution to Problem

An antenna device according to the present disclosure includes: at least one first radiation plate having a first feed point and a first ground end portion, and configured to radiate a first radio wave; and at least one second radiation plate having a second feed point and a second ground end portion, and configured to radiate a radio wave of a frequency different from a frequency of the first radio wave. When the antenna device is viewed from a first direction orthogonal to a polarization direction of the first radio wave, the at least one first radiation plate and the at least one second radiation plate do not overlap.

In the antenna device described above, the first radiation plate and the second radiation plate respectively have the first ground end portion and the second ground end portion. That is, the first radiation plate and the second radiation plate are not a normal patch antenna without grounded portion, but a one side short-circuited patch antenna (plate-like inverted-F antenna) with one end portion thereof grounded.

Furthermore, in the antenna device described above, when the antenna device is seen through from a first direction orthogonal to the polarization direction of the first radio wave, the first radiation plate and the second radiation plate are disposed so as not to overlap with each other. That is, the first radiation plate and the second radiation plate are not disposed in a row in the first direction. With this, it is suppressed that the distance between the first radiation plate and the second radiation plate adjacent to each other becomes too short. As a result, it may be made unlikely that radiation characteristics such as front gain or beam shape deteriorate.

Advantageous Effects

According to the present disclosure, in a multiband communication device including a one side short-circuited patch antenna, it may be made unlikely that radiation characteristics deteriorate.

DESCRIPTION OF EMBODIMENTS

Figure 1:
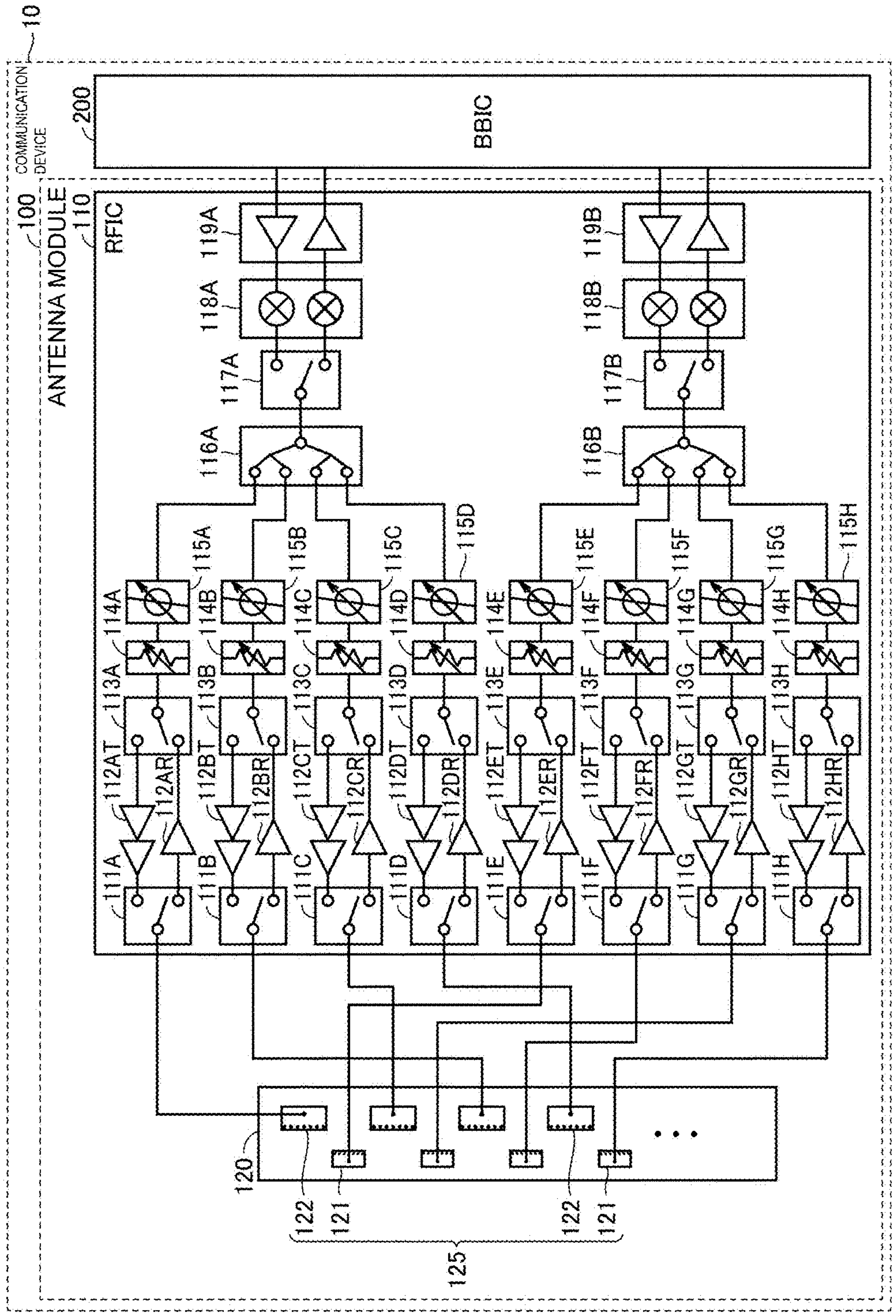
FIG. 1 is a block diagram of an example of a communication device to which an antenna device is applied.

Hereinafter, embodiments of the present disclosure will be described in detail with reference to the drawings. In the drawings, the same or corresponding portions are denoted by the same reference signs, and description thereof will not be repeated.

Basic Configuration of Communication Device

FIG. 1 is a block diagram of an example of a communication device 10 to which an antenna device 120 according to the present embodiment is applied. The communication device 10 is: a mobile terminal such as a mobile phone, a smartphone, or a tablet; or a personal computer having a communication function, for example.

As described in FIG. 1, the communication device 10 includes an antenna module 100 and a BBIC 200 constituting a baseband signal processing circuit. The antenna module 100 includes an RFIC 110, which is an example of a power supply circuit, and the antenna device 120. The communication device 10 up-converts a signal transferred from the BBIC 200 to the antenna module 100 into a radio frequency signal and radiates the radio frequency signal from the antenna device 120. The communication device 10 down-converts a radio frequency signal received by the antenna device 120 and the BBIC 200 processes the down-converted signal.

The antenna device 120 includes multiple first radiation plates 121 and multiple second radiation plates 122. Both the first, radiation plate 121 and the second radiation plate 122 are a one side short-circuited patch antenna having a flat plate shape. The multiple first radiation plates 121 are disposed in a row at predetermined intervals. The multiple second radiation plates 122 are also disposed in a row at predetermined intervals.

The antenna device 120 is configured such that the first radiation plate 121 and the second radiation plate 122 are able to radiate radio waves in respective frequency bands. That is, the antenna device 120 is a multiband (dual band) antenna device. The size of the first radiation plate 121 and the size of the second radiation plate 122 are different from each other. Specifically, the size of the first radiation plate 121 is smaller than the size of the second radiation plate 122. The first radiation plate 121 is configured to be able to radiate a radio frequency signal in a band of a first frequency f1. The second radiation plate 122 is configured to be able to radiate a radio frequency signal in a band of a second frequency f2 lower than the first frequency f1. The first frequency f1 and the second frequency f2 are not particularly limited, but may respectively be set to 39 GHz and 28 GHz, for example.

In FIG. 1, for ease of description, among the multiple first radiation plates 121 and the multiple second radiation plates 122 constituting the antenna device 120, only configurations corresponding to four first radiation plates 121 and four second radiation plates 122 are described. Configurations corresponding to other first radiation plates 121 and other second radiation plates 122, which have the configurations similar to the above, are omitted.

The RFIC 110 includes switches 111A to 111H, 113A to 113H, 117A, and 117B, power amplifiers 112AT to 112HT, low-noise amplifiers 112AR to 112HR, attenuators 114A to 114H, phase-shifters 115A to 115H, signal combiners/dividers 116A and 116B, mixers 118A and 118B, and amplification circuits 119A and 119B. Among the above, configurations of the switches 111A to 111D, 113A to 113D, and 117A, the power amplifiers 112AT to 112DT, the low-noise amplifiers 112AR to 112DR, the attenuators 114A to 114D, the phase-shifters 115A to 115D, the signal combiner/divider 116A, the mixer 118A, and the amplification circuit 119A are circuits for a radio frequency signal in the first frequency band radiated from the first radiation plate 121. Further, configurations of the switches 111E to 111H, 113E to 113H, and 117B, the power amplifiers 112ET to 112HT, the low-noise amplifiers 112ER to 112HR, the attenuators 114E to 114H, the phase-shifters 115E to 115H, the signal combiner/divider 116B, the mixer 118B, and the amplification circuit 119B are circuits for a radio frequency signal in the second frequency band radiated from the second radiation plate 122.

In a case of transmitting a radio frequency signal, the switches 111A to 111H and 113A to 113H are switched to the power amplifiers 112AT to 112HT side, and the switches 117A and 117B are connected to the transmission side amplifiers in the amplification circuits 119A and 119B. In a case of receiving a radio frequency signal, the switches 111A to 111H and 113A to 113H are switched to the low-noise amplifiers 112AR to 112HR side, and the switches 117A and 117B are connected to the reception side amplifiers in the amplification circuits 119A and 119B.

The signal transferred from the BBIC 200 is amplified by the amplification circuits 119A and 119B and up-converted by the mixers 118A and 118B. The transmission signal, which is the up-converted radio frequency signal, is divided into four signals by the signal combiners/dividers 116A and 116B. The four signals pass through corresponding signal paths, and are supplied to the first radiation plate 121 and the second radiation plate 122 which are different from each other. The directivity of the antenna device 120 may be adjusted by individually adjusting the phase shift, in the phase-shifters 115A to 115H disposed in the respective signal paths.

Reception signals, which are radio frequency signals received by the first radiation plate 121 and the second radiation plate 122, are transferred to the RFIC 110, respectively go through four different, signal paths, and are combined in the signal combiners/dividers 116A and 116B. The combined reception signals are down-converted by the mixers 118A and 118B, amplified by the amplification circuits 119A and 119B, and transferred to the BBIC 200.

Disposition of Antenna Device

Figure 2:
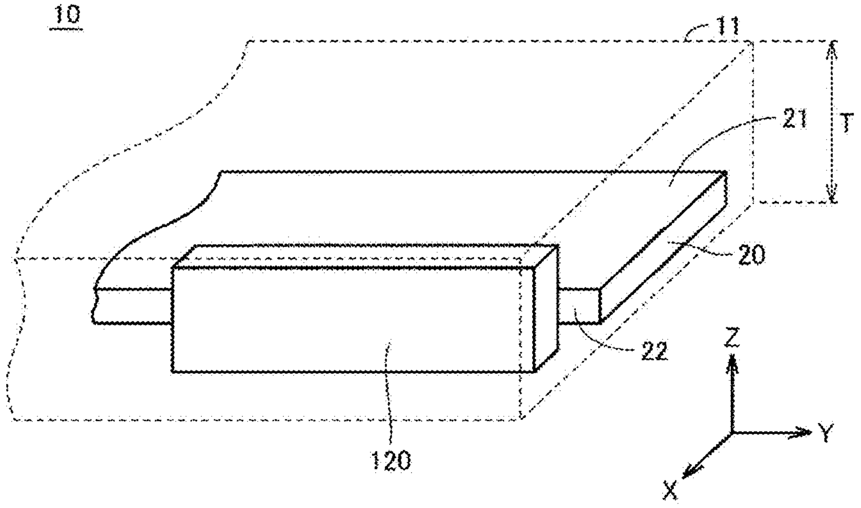
FIG. 2 is a perspective view of the communication device seeing through the inside thereof.

FIG. 2 is a perspective view of the communication device 10 seeing through the inside thereof. The communication device 10 is covered with a housing 11. The antenna device 120 and a mounting substrate 20 to which the antenna device 120 is mounted are provided inside the housing 11. The antenna device 120 is disposed adjacent to a side surface 22 of the mounting substrate 20, not to a main surface 21 of the mounting substrate 20.

Figure 3:
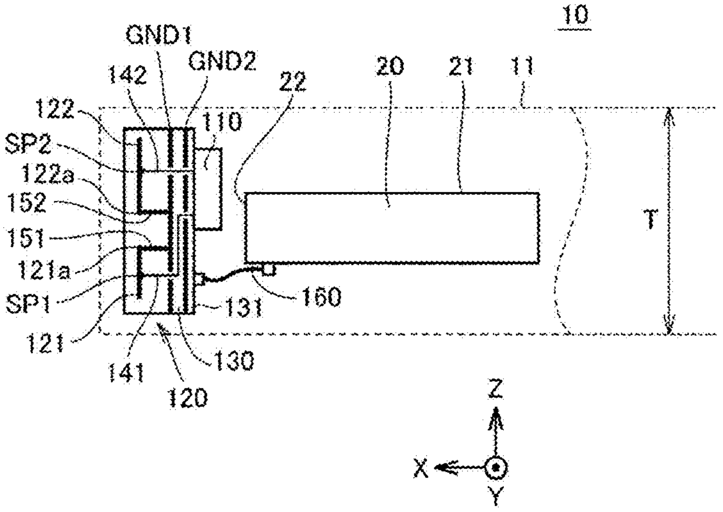
FIG. 3 is a side view of the communication device seeing through the inside thereof.

FIG. 3 is a side view of the communication device 10 seeing through the inside thereof from a direction along the main surface 21 and the side surface 22 of the mounting substrate 20. As described above, the antenna device 120 is disposed adjacent to the side surface 22 of the mounting substrate 20. The antenna device 120 and the mounting substrate 20 are connected by a connection line 160.

The antenna device 120 is formed by a dielectric 130 in which multiple dielectric layers are laminated in a lamination direction. The dielectric 130 is formed of a resin such as epoxy or polyimide, for example. The dielectric 130 may be formed using a liquid crystal polymer (LCP) or a fluorine-based resin having further lower permittivity. The RFIC 110 is mounted to an inner surface 131 of the dielectric 130.

Two flat ground plates GND1 and GND2 extending in a direction along the inner surface 131 are provided in a layer of the dielectric 130 close to the inner surface 131. Hereinafter, a normal direction of the ground plate GND1 is also referred to as an "X-axis direction", a direction along the longitudinal direction of the antenna device 120 which is an extending direction of the ground plate GND1 is referred to as a "Y-axis direction", and a direction perpendicular to the X-axis direction and the Y-axis direction is referred to as a "Z-axis direction". In the following description of the antenna device 120, the positive direction of the X-axis may be referred to as "up" and the negative direction of the X-axis may be referred to as "low".

The ground plates GND1 and GND2 are disposed in lower layers of the dielectric 130, and are configured to extend in the Y-axis direction and the Z-axis direction over the entire lower layers. The ground plates GND1 and GND2 are disposed next to each other at a predetermined interval in the X-axis direction.

Both the first radiation plate 121 and the second radiation plate 122 are disposed to face the ground plate GND1. The thickness (length in the Z-axis direction) T of the housing 11 of the communication device 10 is considerably shorter than the length in the X-axis direction and the length in the Y-axis direction of the housing 11. The length of the antenna device 120 in the Z-axis direction is restricted by the small thickness T of the housing 11. In view of this point, in the antenna device 120 according to the present embodiment, a one side short-circuited patch antenna is adopted as the first radiation plate 121 and the second radiation plate 122 instead of a normal patch antenna in order to reduce the length in the Z-axis direction.

The first, radiation plate 121 has a feed point SP1 to be connected to the RFIC 110 with a first feed line 141 and a ground end portion 121*a* to be connected to the ground plate GND1 with a first ground via 151. The second radiation plate 122 has a feed point SP2 to be connected to the RFIC 110 with a second feed line 142 and a ground end portion 122*a* to be connected to the ground plate GND1 with a second ground via 152.

A signal from the RFIC 110 is supplied to the feed point SP1 of the first radiation plate 121 through the first feed line 141, whereby a radio frequency signal in the first frequency f1 (39 GHz, for example) band is radiated from the first radiation plate 121. The feed point SP1 of the first radiation plate 121 is disposed on the negative direction side of the Z-axis relative to the ground end portion 121*a*. With this, a radio wave of the first frequency f1 (hereinafter also referred to as a "first radio wave") having a polarization direction in the Z-axis direction is radiated from the first radiation plate 121, in a direction obtained by inclining the positive direction of the X-axis toward the negative direction side of the Z-axis (direction from the ground end portion 121*a* toward the feed point SP1).

A signal from the RFIC 110 is supplied to the feed point SP2 of the second radiation plate 122 through the second feed line 142, whereby a radio frequency signal in the second frequency f2 (28 GHz, for example) band is radiated from the second radiation plate 122. The feed point SP2 of the second radiation plate 122 is disposed on the positive direction side of the Z-axis relative to the ground end portion 122*a*. With this, a radio wave of the second frequency f2 (hereinafter also referred to as a "second radio wave") having a polarization direction in the Z-axis direction is radiated from the second radiation plate 122, in a direction obtained by inclining the positive direction of the X-axis toward the positive direction side of the Z-axis (direction from the ground end portion 122*a* toward the feed point SP2).

As illustrated in FIG. 3, when the antenna device 120 is viewed from the Y-axis direction orthogonal to the polarization direction (Z-axis direction) of the first radio wave, the first radiation plate 121 and the second radiation plate 122 are disposed so as not to overlap with each other.

Figure 4:
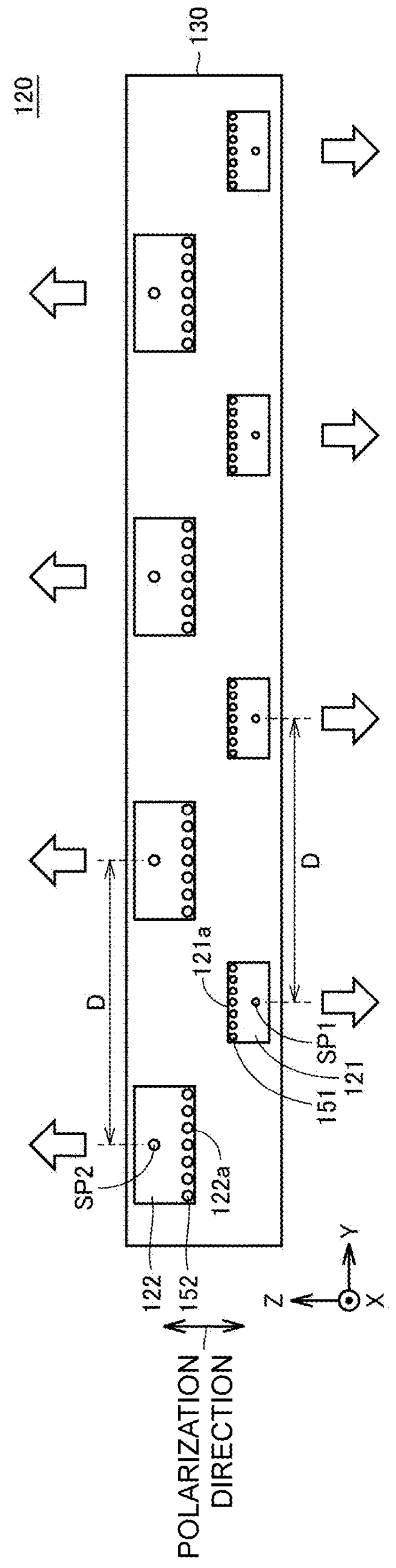
FIG. 4 is a view (part 1) of the antenna device seeing through the inside thereof.

FIG. 4 is a view of the antenna device 120 seeing through the inside thereof from the X-axis direction. The multiple first radiation plates 121 are disposed in a row in the Y-axis direction at predetermined intervals D. The multiple second radiation plates 122 are also disposed in a row in the Y-axis direction at predetermined intervals D. With this, a dual band array antenna capable of supporting the first frequency f1 and the second frequency f2 is formed.

The array of the second radiation plates 122 is disposed on the positive direction side of the Z-axis relative to the array of the first radiation plates 121. With this, when the antenna device 120 is viewed from the Y-axis direction orthogonal to the polarization direction (Z-axis direction) of the first radio wave, the first radiation plate 121 and the second radiation plate 122 are disposed so as not to overlap with each other. Further, in the present embodiment, when the antenna device 120 is viewed from the Z-axis direction, the first radiation plate 121 and the second radiation plate 122 are alternately disposed without overlapping with each other.

Note that, an example in which the multiple first ground vias 151 are connected to the entire ground end portion 121*a* of the first radiation plate 121 is illustrated in FIG. 4, but a portion to which the first ground vias 151 are connected may be a part of the ground end portion 121*a* of the first radiation plate 121. Similarly, an example in which the multiple second ground vias 152 are connected to the entire ground end portion 122*a* of the second radiation plate 122 is illustrated in FIG. 4, but a portion to which the second ground vias 152 are connected may be a part of the ground end portion 122*a* of the second radiation plate 122.

Characteristics of Antenna Device

Characteristics of the antenna device 120 having the configuration described above will be described.

As described above, in the antenna device 120 according to the present embodiment, when the antenna device 120 is seen through from the Y-axis direction orthogonal to the polarization direction of the first radio wave, the first radiation plate 121 and the second radiation plate 122 are disposed so as not to overlap with each other. That is, the first radiation plate 121 and the second radiation plate 122 are not disposed in a row in the first direction. With this, it is possible to prevent the distance between the first radiation plate 121 and the second radiation plate 122 adjacent to each from becoming too short. As a result, it may be made unlikely that the characteristics such as the front gain or the beam shape of the first radio wave radiated from the first radiation plate 121 deteriorate, and the characteristics such as the front gain or the beam shape of the second radio wave radiated from the second radiation plate 122 deteriorate. Note that the Y-axis direction, the first radiation plate 121, and the second radiation plate 122 may respectively correspond to the "first direction", the "first radiation plate", and the "second radiation plate" of the present disclosure.

In the antenna device 120 according to the present embodiment, the first radiation plate 121 and the second radiation plate 122 are one side short-circuited patch antennas that radiate radio waves having a polarization direction in the Z-axis direction. Therefore, it is possible to reduce the length of each of the first radiation plate 121 and the second radiation plate 122 in the Z-axis direction to approximately half, as compared with a case that each of the first radiation plate 121 and the second radiation plate 122 is a normal patch antenna. With this, it is possible to shorten the length of the antenna device 120 in the Z-axis direction, which is restricted by the small thickness T of the housing 11.

Further, in the antenna device 120 according to the present embodiment, the direction of the first radiation plate 121 from the ground end portion 121*a* toward the feed point SP1 (hereinafter also referred to as the "direction of the first radiation plate 121") is the negative direction of the Z-axis. With this, the first radio wave of the first frequency f1 from the first radiation plate 121 may be radiated in a direction obtained by inclining the positive direction of the X-axis toward the negative direction side of the Z-axis. Whereas, the direction of the second radiation plate 122 from the ground end portion 122*a* toward the feed point SP2 (hereinafter also referred to as the "direction of the second radiation plate 122") is the positive direction of the Z-axis. With this, the second radio wave of the second frequency f2 from the second radiation plate 122 may be radiated in a direction obtained by inclining the positive direction of the X-axis toward the positive direction side of the Z-axis.

Modification 1

In the antenna device 120 according to the embodiment described above, the direction of the first radiation plate 121 and the direction of the second radiation plate 122 are opposite to each other.

However, the direction of the first radiation, plate 121 and the direction of the second radiation plate 122 may be the same as each other.

Figure 5:
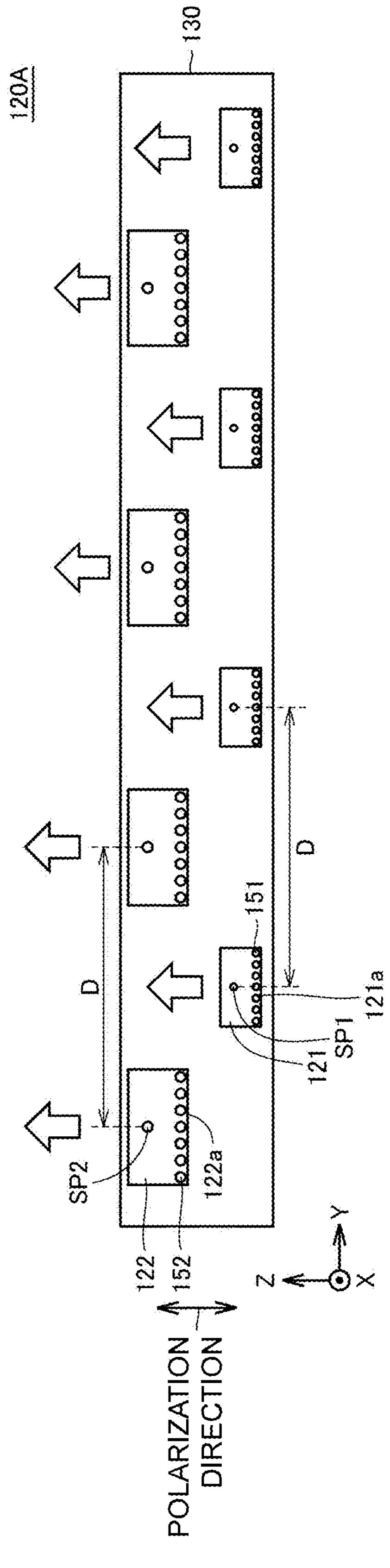
FIG. 5 is a view (part 2) of an antenna device seeing through the inside thereof.

FIG. 5 is a view of an antenna device 120A according to present Modification 1 seeing through the inside thereof from the X-axis direction. The antenna device 120A is obtained by reversing the direction of each first radiation plate 121 of the antenna device 120 described above around the X-axis. That is, the direction of the first radiation plate 121 is changed from the negative direction of the Z-axis to the positive direction of the Z-axis. Since other configurations of the antenna device 120A are the same as those of the antenna device 120 described above, detailed description thereof will not be repeated here.

With the change described above, both the direction of the first radiation plate 121 and the direction of the second radiation plate 122 are the positive direction of the Z-axis. With this, it is possible to make the radiation direction of the first radio wave and the radiation direction of the second radio wave be the same with each other. That is, it is possible to radiate both the first radio wave and the second radio wave in a direction obtained by inclining the positive direction of the X-axis toward the positive direction side of the Z-axis.

Modification 2

In the antenna device 120 according to the embodiment described above and the antenna device 120A according to Modification 1, there has been described an example in which the interval between the first radiation plates 121 adjacent to each other and the interval between the second radiation plates 122 adjacent to each other are the same predetermined interval D.

However, the interval between the first radiation plates 121 adjacent to each other may be different from the interval between the second radiation plates 122 adjacent to each other.

Figure 6:
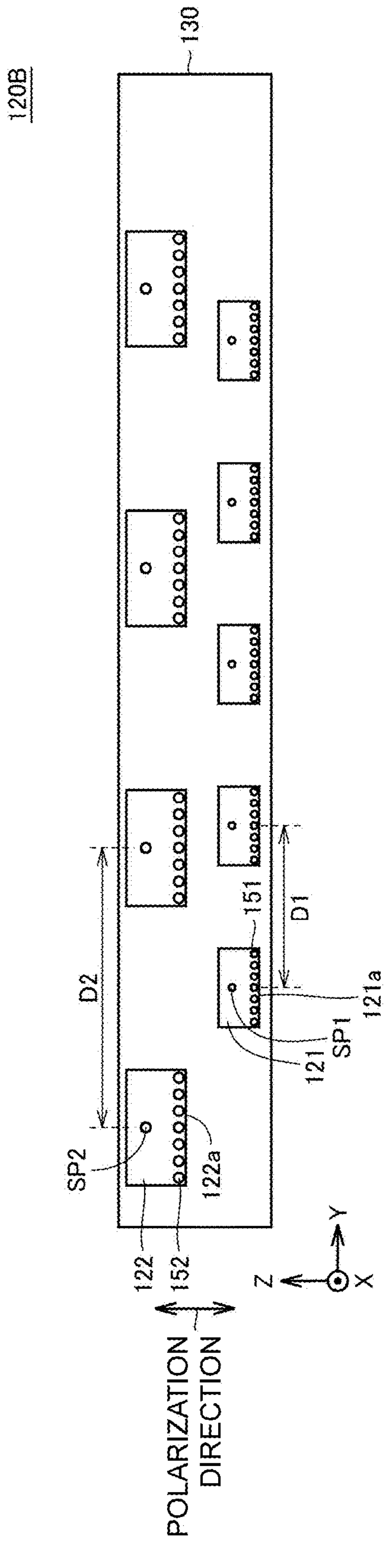
FIG. 6 is a view (part 3) of an antenna device seeing through the inside thereof.

FIG. 6 is a view of an antenna device 120B according to present Modification 2 seeing through the inside thereof from the X-axis direction. In the antenna device 120B, using the antenna device 120A according to Modification 1 described above as a basis, an interval D1 between the first radiation plates 121 adjacent to each other and an interval D2 between the second radiation plates 122 adjacent to each other are made different from each other. Specifically, in view of the fact that the first frequency f1 of the first radio wave is higher than the second frequency f2 of the second radio wave, the interval D1 between the first radiation plates 121 adjacent to each other is made shorter than the interval D2 between the second radiation plates 122 adjacent to each other. Since other configurations of the antenna device 120B are the same as those of the antenna device 120A described above, detailed description thereof will not be repeated here.

With the change described above, the interval D1 between the second radiation plates 122 adjacent to each other may be set to a value suitable for the second frequency f2 of the second radio wave, while the interval D1 between the first radiation plates 121 adjacent to each other is set to a value suitable for the first frequency f1 of the first radio wave.

In general, when an array antenna is formed, it is desirable that the distance between the plane centers of antennas adjacent to each other be approximately one half of the wavelength, and as the distance between the plane centers becomes greater than one half of the wavelength, there arises a possibility that the side lobe level increases. In consideration of this point, in the antenna device 120B, in view of the fact that the first frequency f1 of the first radio wave is higher than the second frequency f2 of the second radio wave, the interval D1 between the first radiation plates 121 adjacent to each other is made shorter than the interval D2 between the second radiation plates 122 adjacent to each other. With this, it is possible to reduce the side lobe level particularly when the first radio wave of the first frequency f1 is radiated from the first radiation plate 121.

Modification 3

In the antenna device 120 according to the embodiment described above and the antenna device 120A according to Modification 1, the directions of the multiple first radiation plates 121 are all the same, and the directions of the multiple second radiation plates 122 are all the same.

However, the direction of a part of the multiple first radiation plates 121 may be different from the direction of the remaining part. Further, the direction of a part of the multiple second radiation plates 122 may be different from the direction of the remaining part.

Figure 7:
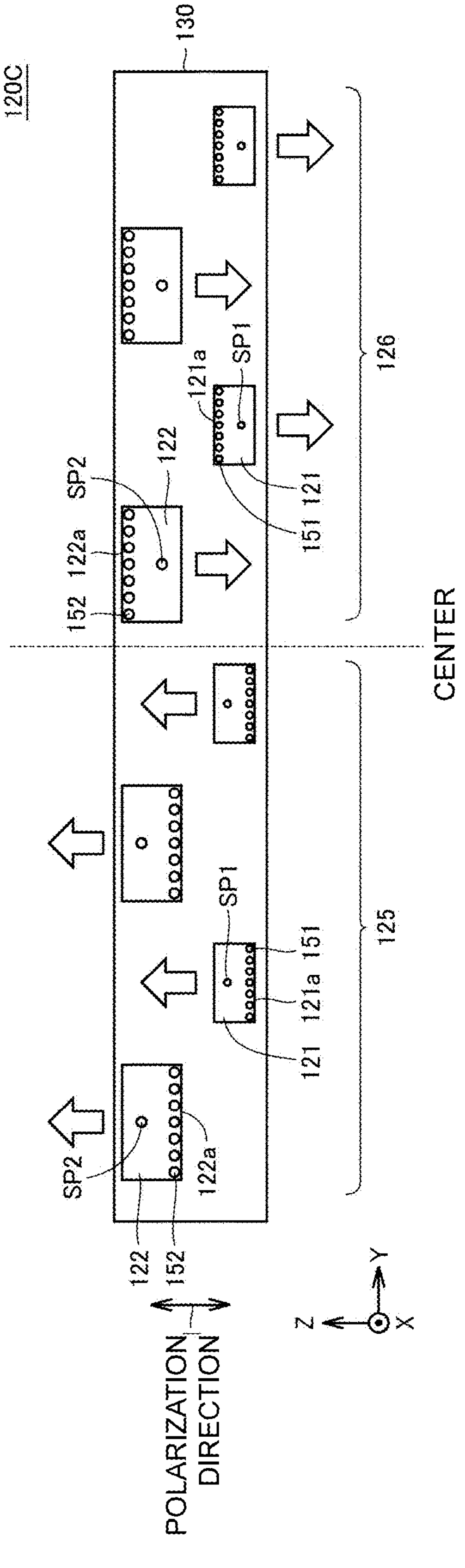
FIG. 7 is a view (part 4) of an antenna device seeing through the inside thereof.

FIG. 7 is a view of an antenna device 120C according to present Modification 3 seeing through the inside thereof from the X-axis direction. In the antenna device 120C, using the antenna device 120A according to Modification 1 described above as a basis, the directions of the first radiation plates 121 and the second radiation plates 122, which are disposed on the positive direction side of the Y-axis relative to the center in the Y-axis direction, are reversed around the X-axis.

Specifically, the antenna device 120C includes a first antenna group 125 and a second antenna group 126 that are disposed side by side in the Y-axis direction. Each of the first antenna group 125 and the second antenna group 126 includes the multiple first radiation plates 121 disposed side by side in the Y-axis direction and the multiple second radiation plates 122 disposed side by side in the Y-axis direction.

All of the directions of the multiple first radiation plates 121 and the second radiation plates 122 included in the first antenna group 125 are the positive direction of the Z-axis. All of the directions of the multiple first radiation plates 121 and the second radiation plates 122 included in the second antenna group 126 are the negative direction of the Z-axis. With the change described above, the first radio wave and the second radio wave may be radiated in both the positive direction and the negative direction of the Z-axis. Note that, in present Modification 3, the first antenna group 125, the second antenna group 126, the positive direction of the Z-axis, and the negative direction of the Z-axis may respectively correspond to a "first antenna group", a "second antenna group", a "second direction", and a "third direction" of the present disclosure.

Modification 4

The number of frequency bands that the antenna device 120 according to the embodiment described above is able to support is two (the first frequency f1 and the second frequency f2), but the number of frequency bands that an antenna device is able to support may be three or more. That is, in addition to the first, radiation plate 121 and the second radiation plate 122, a modification may be made to include an antenna that radiates a radio wave in a frequency band different from the first frequency f1 and the second frequency f2. In this case, the added antenna may be a one side short-circuited patch antenna, a normal patch antenna, or an antenna of a type different, from the patch antenna (dipole antenna, for example).

Modification 5

In the antenna device 120 according to the embodiment described above, the first radiation plate 121 and the second radiation plate 122 are disposed in one dielectric 130 having a laminated structure.

However, it is not limited that the first radiation plate 121 and the second radiation plate 122 are disposed in one dielectric 130. For example, multiple chip (block) antennas each having the first radiation plate 121 formed thereon, and multiple chip antennas each having the second radiation plate 122 formed thereon, may be mounted on a dielectric substrate having the ground plate GND1 formed thereon. In this configuration, the dielectric of the chip antenna need not have a laminated structure.

Modification 6

In the antenna device 120 according to the embodiment described above, the first radiation plate 121 and the second radiation plate 122 are disposed in the same layer in the dielectric 130.

However, the first radiation plate 121 and the second radiation plate 122 may be disposed in different layers in the dielectric 130.

Figure 8:
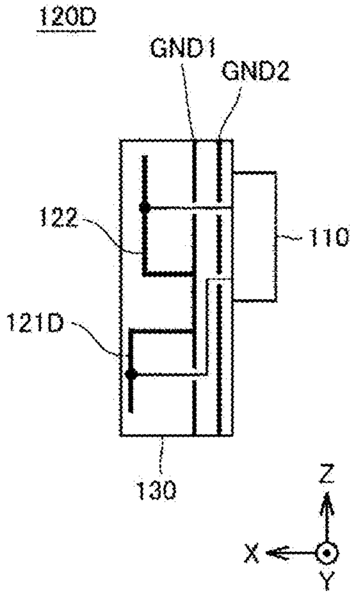
FIG. 8 is a view (part 5) of an antenna device seeing through the inside thereof.

FIG. 8 is a view of an antenna device 120D according to present Modification 6 seeing through the inside thereof from the Y-axis direction. The antenna device 120D is obtained by replacing the first radiation plate 121 of the antenna device 120 described above with a first radiation plate 121D. The first radiation plate 121D is disposed in a layer different from the layer in which the second radiation plate 122 is disposed. Specifically, the first radiation plate 121D is disposed in a layer positioned on the positive direction side of the X-axis relative to the layer in which the second radiation plate 122 is disposed.

In the antenna device 120D described above, the distance between the first radiation plate 121D and the second radiation plate 122 may be made large, as compared with a case that the first radiation plate 121 and the second radiation plate 122 are disposed in the same layer. Thus, the isolation between the first radio wave and the second radio wave may further be increased.

Figure 9:
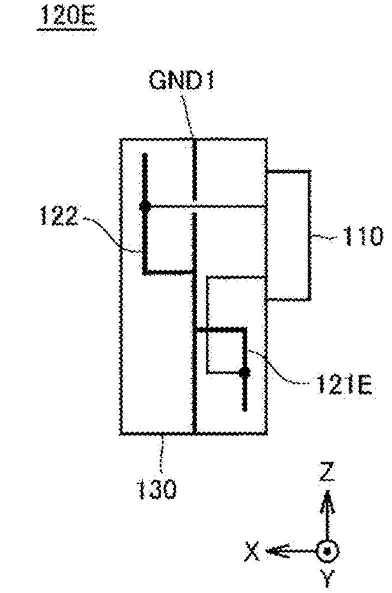
FIG. 9 is a view (part 6) of an antenna device seeing through the inside thereof.

FIG. 9 is a view of another antenna device 120E according to present Modification 6 seeing through the inside thereof from the Y-axis direction. The antenna device 120E is obtained by replacing the first radiation plate 121 of the antenna device 120 described above with a first radiation plate 121E, and further removing the ground plate GND2 of the antenna device 120 described above. The first radiation plate 121E is disposed in a layer different from the layer that the second radiation plate 122 is disposed. Specifically, the first radiation plate 121E is disposed in a layer positioned on the side (X-axis negative direction side) opposite to the second radiation plate 122 with the ground plate GND1 interposed therebetween.

In the antenna device 120E described above, the radiation direction of the first radio wave and the radiation direction of the second radio wave may be made opposite to each other. Furthermore, since the ground plate GND1 is disposed between the first radiation plate 121 and the second radiation plate 122, the isolation between the first radio wave and the second radio wave may further be increased.

Modification 7

In the antenna device 120 according to the embodiment described above, the dielectric 130 is formed of one substrate, and the first radiation plate 121, the second radiation plate 122, and the ground plates GND1 and GND2 are provided in one substrate. However, the configuration may be as follows. The dielectric 130 is formed of multiple substrates disposed at predetermined intervals in the X-axis direction, and the respective substrates include the first radiation plate 121 and the second radiation plate 122, and the ground plates GND1 and GND2.

Figure 10:
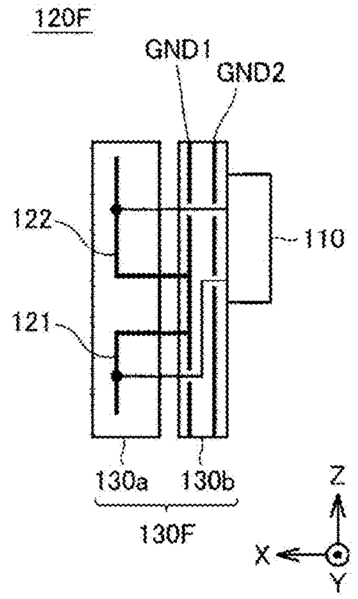
FIG. 10 is a view (part 7) of an antenna device seeing through the inside thereof.

FIG. 10 is a view of an antenna device 120F according to present Modification 7 seeing through the inside thereof from the Y-axis direction. The antenna device 120F is obtained by replacing the dielectric 130 of the antenna device 120 described above with a dielectric 130F. The dielectric 130F includes a first substrate 130*a* and a second substrate 130*b* that are disposed at a predetermined interval in the X-axis direction. The first radiation plate 121 and the second radiation plate 122 are provided in the first substrate 130*a*, and the ground plates GND1 and GND2 are provided in the second substrate 130*b*. The antenna device 120F described above may be used.

The embodiment disclosed herein is to be considered as illustrative and not restrictive in all respects. The scope of the present disclosure is defined not by the description of the embodiment described above but by the claims, and is intended to include all modifications within the meaning and scope equivalent to the claims.

The invention claimed is:

1. An antenna device, comprising:

at least one first radiation plate having a first feed point and a first ground end portion, and configured to radiate a first radio wave; and at least one second radiation plate having a second feed point and a second ground end portion, and configured to radiate a radio wave of a frequency different from a frequency of the first radio wave, wherein when the antenna device is viewed from a first direction orthogonal to a polarization direction of the first radio wave, the at least one first radiation plate and the at least one second radiation plate do not overlap, the at least one first radiation plate includes multiple first radiation plates, the at least one second radiation plate includes multiple second radiation plates, the antenna device includes a first antenna group and a second antenna group disposed side by side in the first direction, each of the first antenna group and the second antenna group includes the multiple first radiation plates disposed side by side in the first direction and the multiple second radiation plates disposed side by side in the first direction, a direction of the multiple first radiation plates included in the first antenna group from the first ground end portion toward the first feed point is a second direction orthogonal to the first direction, a direction of the multiple second radiation plates included in the first antenna group from the second ground end portion toward the second feed point is the second direction, and a direction of the multiple first radiation plates included in the second antenna group from the first ground end portion toward the first feed point is a third direction opposite to the second direction.

2. The antenna device of claim 1, wherein a direction of the at least one first radiation plate from the first ground end portion toward the first feed point is opposite to a direction of the at least one second radiation plate from the second ground end portion toward the second feed point.

3. The antenna device of claim 1, wherein a direction of the at least one first radiation plate from the first ground end portion toward the first feed point is the same as a direction of the at least one second radiation plate from the second ground end portion toward the second feed point.

4. The antenna device of claim 1, wherein the multiple first radiation plates are disposed side by side at a predetermined interval in the first direction.

5. The antenna device of claim 1, wherein the multiple second radiation plates are disposed side by side at a predetermined interval in the first direction.

6. The antenna device of claim 1, wherein the multiple first radiation plates are disposed side by side at a predetermined interval in the first direction, the multiple second radiation plates are disposed side by side at a predetermined interval in the first direction, and the multiple first radiation plates and the multiple second radiation plates are alternately disposed.

7. The antenna device of claim 1, wherein a direction of the multiple second radiation plates included in the second antenna group from the second ground end portion toward the second feed point is the third direction.

8. The antenna device of claim 1, wherein a frequency of the first radio wave is greater than a frequency of the second radio wave.

9. The antenna device of claim 1, wherein the multiple first radiation plates are disposed at a first predetermined interval in the first direction, and the multiple second radiation plates disposed at a second predetermined interval in the first direction.

10. The antenna device of claim 9, wherein a distance of the first predetermined interval is the same as a distance of the second predetermined interval.

11. The antenna device of claim 9, wherein a distance of the first predetermined interval is different from a distance of the second predetermined interval.

12. An antenna module, comprising:

an antenna device including at least one first radiation plate having a first feed point and a first ground end portion, and configured to radiate a first radio wave; and at least one second radiation plate having a second feed point and a second ground end portion, and configured to radiate a radio wave of a frequency different from a frequency of the first radio wave, wherein when the antenna device is viewed from a first direction orthogonal to a polarization direction of the first radio wave, the at least one first radiation plate and the at least one second radiation plate do not overlap; and a power supply circuit configured to supply a radio frequency signal to the antenna device, the at least one first radiation plate includes multiple first radiation plates, the at least one second radiation plate includes multiple second radiation plates, the antenna device includes a first antenna group and a second antenna group disposed side by side in the first direction, each of the first antenna group and the second antenna group includes the multiple first radiation plates disposed side by side in the first direction and the multiple second radiation plates disposed side by side in the first direction, a direction of the multiple first radiation plates included in the first antenna group from the first ground end portion toward the first feed point is a second direction orthogonal to the first direction, a direction of the multiple second radiation plates included in the first antenna group from the second ground end portion toward the second feed point is the second direction, and a direction of the multiple first radiation plates included in the second antenna group from the first ground end portion toward the first feed point is a third direction opposite to the second direction.

13. A communication device, comprising:

a housing; and an antenna module disposed within the housing, the antenna module including an antenna device including at least one first radiation plate having a first feed point and a first ground end portion, and configured to radiate a first radio wave; and at least one second radiation plate having a second feed point and a second ground end portion, and configured to radiate a radio wave of a frequency different from a frequency of the first radio wave, wherein when the antenna device is viewed from a first direction orthogonal to a polarization direction of the first radio wave, the at least one first radiation plate and the at least one second radiation plate do not overlap; and a power supply circuit configured to supply a radio frequency signal to the antenna device, the at least one first radiation plate includes multiple first radiation plates, the at least one second radiation plate includes multiple second radiation plates, the antenna device includes a first antenna group and a second antenna group disposed side by side in the first direction, each of the first antenna group and the second antenna group includes the multiple first radiation plates disposed side by side in the first direction and the multiple second radiation plates disposed side by side in the first direction, a direction of the multiple first radiation plates included in the first antenna group from the first ground end portion toward the first feed point is a second direction orthogonal to the first direction, a direction of the multiple second radiation plates included in the first antenna group from the second ground end portion toward the second feed point is the second direction, and a direction of the multiple first radiation plates included in the second antenna group from the first ground end portion toward the first feed point is a third direction opposite to the second direction.

* * * * *